United States Patent
Chun et al.

(10) Patent No.: US 8,064,406 B2
(45) Date of Patent: Nov. 22, 2011

(54) METHOD OF TRANSMITTING CHANNEL QUALITY INDICATOR IN WIRELESS COMUNICATION SYSTEM

(75) Inventors: Jin Young Chun, Anyang-si (KR); Bin Chul Ihm, Anyang-si (KR); Jin Hyuk Jung, Anyang-si (KR); Jae Wan Kim, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/448,846

(22) PCT Filed: Mar. 21, 2008

(86) PCT No.: PCT/KR2008/001605
§ 371 (c)(1), (2), (4) Date: Dec. 24, 2009

(87) PCT Pub. No.: WO2008/115027
PCT Pub. Date: Sep. 25, 2008

(65) Prior Publication Data
US 2010/0110914 A1  May 6, 2010

(30) Foreign Application Priority Data
Mar. 21, 2007 (KR) .................. 10-2007-0027634

(51) Int. Cl.
*H04W 4/00* (2009.01)

(52) U.S. Cl. .......... 370/332; 370/252; 370/329
(58) Field of Classification Search .......... 370/252, 370/328, 329, 333; 455/69
See application file for complete search history.

(56) References Cited

U.S. PATENT DOCUMENTS

| 7,126,996 B2 * | 10/2006 | Classon et al. ........... 375/260 |
| 2005/0201295 A1 * | 9/2005 | Kim et al. ........... 370/241 |
| 2005/0238108 A1 | 10/2005 | Suh et al. |
| 2007/0026813 A1 * | 2/2007 | Khan ........... 455/69 |
| 2007/0098093 A1 * | 5/2007 | Kwon et al. ........... 375/260 |
| 2008/0101407 A1 * | 5/2008 | Khan et al. ........... 370/468 |

FOREIGN PATENT DOCUMENTS
KR  10-2008-0004701 A  1/2008
* cited by examiner Primary Examiner — Ricky Ngo
Assistant Examiner — Rasheed Gidado
(74) Attorney, Agent, or Firm — McKenna Long & Aldridge LLP

(57) ABSTRACT

A method of transmitting a channel quality indicator (CQI) includes obtaining CQIs for each of a plurality of sub-bands, a sub-band comprising a plurality of sub-carriers, dividing the plurality of sub-bands into a plurality of layers according to a CQI of a sub-band, a layer comprising at least one sub-band, obtaining a representative value of a representative layer, the representative layer including a sub-band having maximum CQI and transmitting the representative value of the representative layer. Signaling overhead due to CQI feedback can be reduced.

6 Claims, 7 Drawing Sheets

ively, to a method of transmitting channel
METHOD OF TRANSMITTING CHANNEL QUALITY INDICATOR IN WIRELESS COMUNICATION SYSTEM This application is a national phase entry of International Application No. PCT/KR2008/001605, filed Mar. 21, 2008 and claims priority to Korean Patent Application No. 10-2007-0027634 filed Mar. 21, 2007, all of which are hereby incorporated by reference in their entireties.

TECHNICAL FIELD

The present invention relates to wireless communication, and more particularly, to a method of transmitting channel quality indicator in a wireless communication system.

BACKGROUND ART

In order to transmit a high-quality and high-capacity of data using limited radio resources in a wireless communication system, a variety of transmission methods have been developed and employed.

Closed-loop system provides a feedback channel from a user equipment to a base station. In the closed-loop system, when a user equipment provides channel information to a base station, the base station adjusts several system parameters, such as a power level and a transmission format, based on the channel information in order to maximize the performance. For example, an Adaptive Modulation and Coding (AMC) scheme is a method for increasing link performance by adjusting a modulation and coding scheme (MCS) based on the channel information. When channel state is good, the data rate is increased. On the contrary, when the channel state is not good, the data rate is lowered.

An example of channel information is a channel quality indicator (CQI). In general, the CQI is measured by a user equipment and feedback through an uplink control channel. The base station can assign appropriate resources to each user equipment based on the CQI.

For example, it is assumed that 5 bits ($2^5$=32 level) are used for CQI transmission.

CQI values between −10 dB and 22 dB can be quantized and represented every 1 dB distance. Or, CQI can be represented by one of 32 MCS levels. The 5 bits of CQI are channel-coded and then transmitted. If CQI is missed or distorted during transmission, AMC scheme can be much degraded. Accordingly, CQI needs to have high code rate to guarantee reliable transmission. But high code rate requires lots of radio resources.

In particular, in a multi-carrier system based on Orthogonal Frequency Division Multiplexing (OFDM), CQI may differ per on frequency (sub-carrier) basis. To acquire perfect channel information, it is needed that CQIs for every sub-carrier are measured and reported. But this may cause signaling overhead and low data rate.

Accordingly, there is a need for a method of efficiently transmitting CQI.

DISCLOSURE OF INVENTION

Technical Problem

A method of transmitting channel quality indicator to reduce signaling overhead is provided.

Technical Solution

In an aspect, a method of transmitting a channel quality indicator (CQI) in a wireless communication system is provided. The method includes obtaining CQIs for each of a plurality of sub-bands, a sub-band comprising a plurality of sub-carriers, dividing the plurality of sub-bands into a plurality of layers according to a CQI of a sub-band, a layer comprising at least one sub-band, obtaining a representative value of a representative layer, the representative layer including a sub-band having maximum CQI and transmitting the representative value of the representative layer.

In another aspect, a method of transmitting a channel quality indicator (CQI) in a wireless communication system is provided. The method includes obtaining CQIs for each of a plurality of sub-bands, a sub-band comprising a plurality of sub-carriers, dividing the plurality of sub-bands into a plurality of layers according to a CQI of a sub-band, a layer comprising at least one sub-band, obtaining a first representative value of a first layer and a second representative value of a second layer and transmitting the first representative value and the second representative value.

Advantageous Effects

A plurality of sub-bands is classified into a plurality of layers according to a CQI of each sub-band and a representative value of a layer is reported. Signaling overhead due to CQI feedback can be reduced.

MODE FOR THE INVENTION

Figure 1:
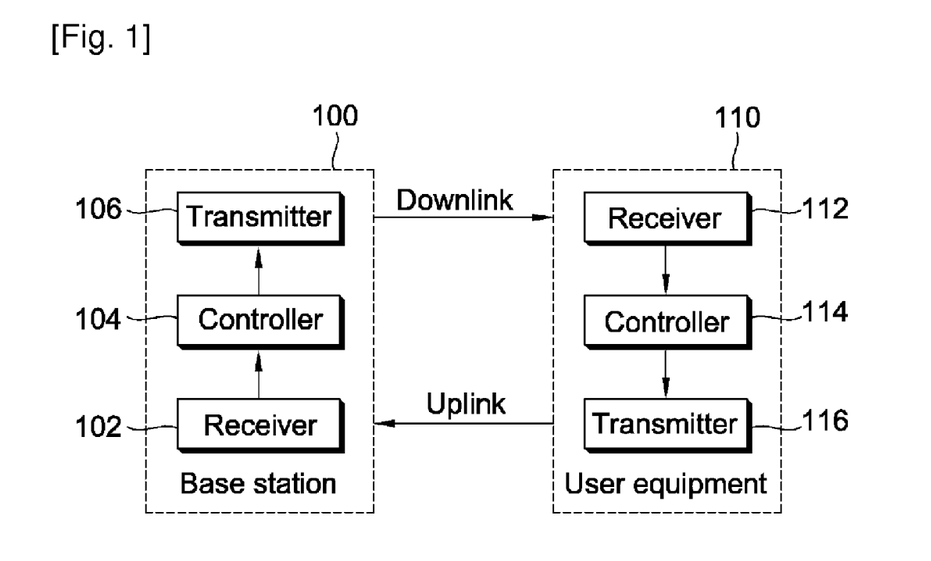
FIG. 1 is a block diagram showing a wireless communication system in accordance with an embodiment of the present invention.

FIG. 1 is a block diagram showing a wireless communication system in accordance with an embodiment of the present invention.

Referring to FIG. 1, a wireless communication system includes a base station (BS) 100, and a user equipment (UE) 110. The communication systems are widely deployed to provide a variety of communication services such as voice and packet data. The base station 100 generally refers to a fixed station communicating with the user equipment 110 and can be referred to as another terminology, such as node-B, a BTS (Base Transceiver System) or an access point. The user equipment 110 can be fixed or mobile and can be referred to as another terminology, such as a MS (Mobile Station), a UT (User Terminal), a SS (Subscriber Station) or a wireless device.

The base station 100 includes a receiver 102, a controller 104 and a transmitter 106. The receiver 102 receives data and CQI through an uplink channel. The controller 104 can schedule a transmission format, a power level, a transmission rate, etc. of the transmitter 106 based on received CQI. The transmitter 106 processes data according to decided transmission format, power level, transmission rate, and so on and transmits the processed data to the user equipment 110 through a downlink channel. The base station 100 assigns the best resources to the user equipment 110 on the basis of feedback CQI, thus increasing data transmission performance.

The user equipment 110 includes a receiver 112, a controller 114 and a transmitter 116. The receiver 112 receives data through an uplink channel. The data can include a pilot signal or a preamble for CQI measurement. The receiver 112 measures CQI based on information included in data. The controller 114 schedules measured CQI according to a channel feedback method. The transmitter 116 transmits scheduled CQI to the base station 100 through an uplink channel.

Figure 2:
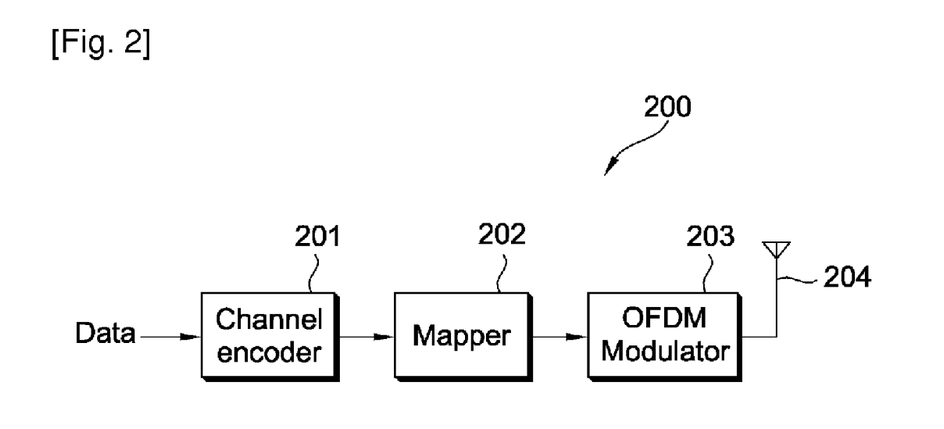
FIG. 2 is a block diagram showing a transmitter in accordance with an embodiment of the present invention.

FIG. 2 is a block diagram showing a transmitter in accordance with an embodiment of the present invention.

Referring to FIG. 2, a transmitter 200 includes a channel encoder 201, a mapper 202 and an OFDM modulator 203. The transmitter 200 can be the transmitter 106 of the base station 100 or the transmitter 116 of the user equipment 110.

The channel encoder 201 encodes input data according to a predetermined coding method, thus forming coded data. The mapper 202 modulates the coded data according to a predetermined modulation method and maps the modulated data to symbols, which represent a location according to an amplitude and phase constellation. The OFDM modulator 203 transforms the input symbols into OFDM symbols. The OFDM modulator 203 can transform the input symbols into time domain samples by performing IFFT (Inverse Fast Fourier Transform) on the input symbols. To the transformed time domain samples can be added a CP (cyclic prefix). The OFDM symbols output from the OFDM modulator 203 are transmitted through an antenna 204.

Figure 3:
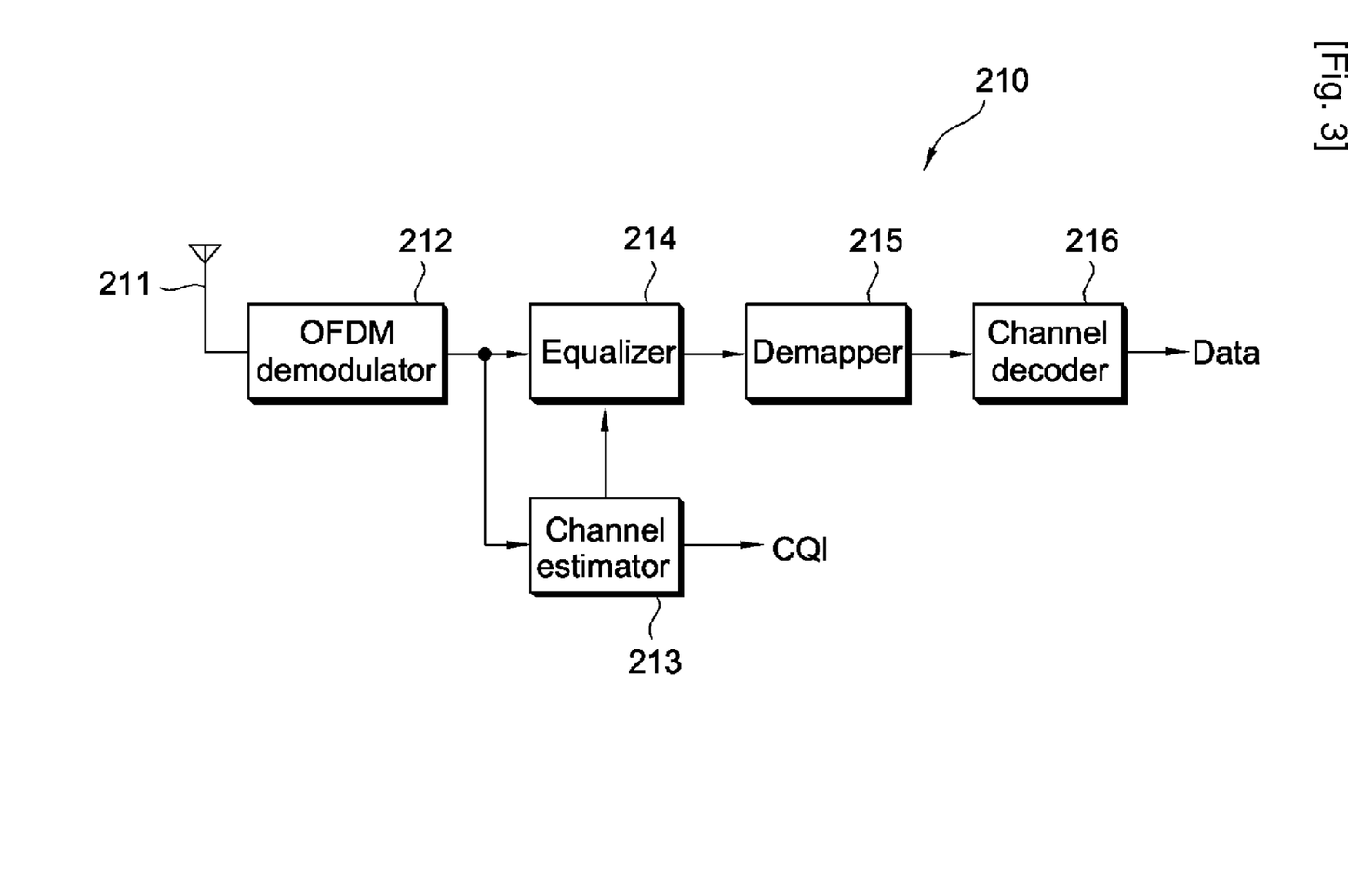
FIG. 3 is a block diagram showing a receiver in accordance with an embodiment of the present invention.

FIG. 3 is a block diagram showing a receiver in accordance with an embodiment of the present invention.

Referring to FIG. 3, a receiver 210 includes an OFDM demodulator 212, a channel estimator 213, an equalizer 214, a demapper 215 and a channel decoder 216. The receiver 210 can be the receiver 102 of the base station 100 or the receiver 112 of the user equipment 110.

A signal received through a receiving antenna 211 is transformed into symbols of a frequency domain by the OFDM demodulator 212. The OFDM demodulator 212 removes a CP from the input signal and can perform FFT (Fast Fourier Transform) on the signal. The channel estimator 213 estimates a channel from a received signal. Channel estimation can be performed in not only the channel estimator 213, but also the controller 114 of the user equipment 110. The equalizer 213 equalizes the output symbols of the OFDM demodulator 212 through the estimated channel and transmits the symbols to the demapper 215. The demapper 215 and the channel decoder 216 perform an inverse process of the signal processing schemes, which have been performed in the channel encoder 201 and the mapper 202 of the transmitter 200.

A single-input single-output (SISO) in which the transmitter 200 and the receiver 210 have one transmission antenna and one reception antenna, respectively, has been described above. But, it is understood that skilled in the art can apply the present inventive concept to a multiple-input multiple-output (MIMO) system.

It has been described that the transmitter 200 and the receiver 210 employ the OFDM (Orthogonal Frequency Division Multiplexing)/OFDMA (Orthogonal Frequency Division Multiple Access) scheme. However, the present inventive concept is not limited to the above scheme and can also be applied to other multiple access schemes, such as TDMA (Time Division Multiple Access) and CDMA (Code Division Multiple Access).

Figure 4:
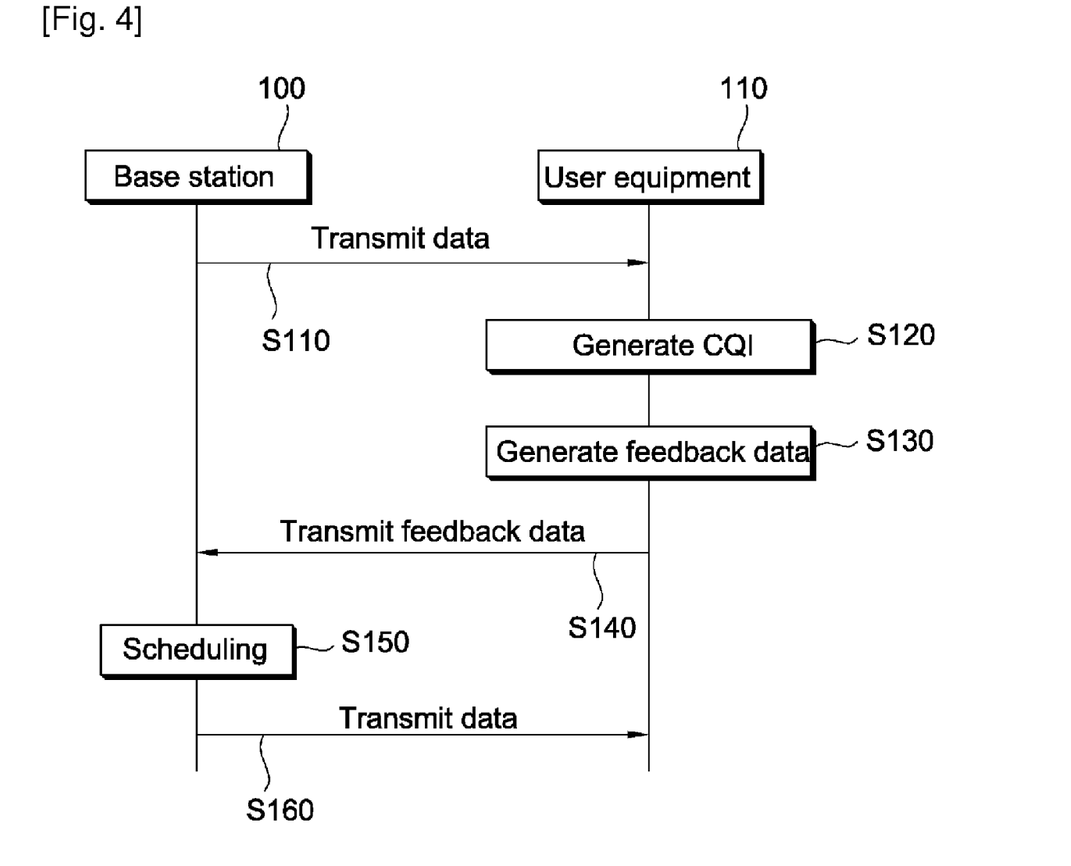
FIG. 4 is a flowchart illustrating communication between a base station and a user equipment.

FIG. 4 is a flowchart illustrating communication between a base station and a user equipment.

Referring to FIG. 4, a base station 100 transmits data to a user equipment 110 (S110). The user equipment 110 generates CQI every sub-band (S120). The CQI refers to information that the user equipment 110 informs the base station 100 of the downlink channel state so that the base station 100 can assign downlink resources to the user equipment 110. The CQI can be various forms, such as SINR (Signal-to-Interference plus Noise Ratio), MCS (Modulation and Coding Scheme) level, a data rate indicator and a received signal strength indicator. The controller 114 of the user equipment 110 can generate CQI according to the various forms by employing a channel provided from the channel estimator.

The user equipment 110 classifies sub-bands into a plurality of layers according to sub-band-based CQI as described later and generates each layered representative value. The user equipment 110 generates feedback data, including the generated representative value and an index (S130). The user equipment 110 transmits the feedback data to the base station 100 (S140). The base station 100 schedules a transmission format, a power level, a date rate and the like through the received feedback data (S150), processes the data based on a decided transmission format, power level, data rate, and so on, and transmits processed data to the user equipment 110 (S160).

Figure 5:
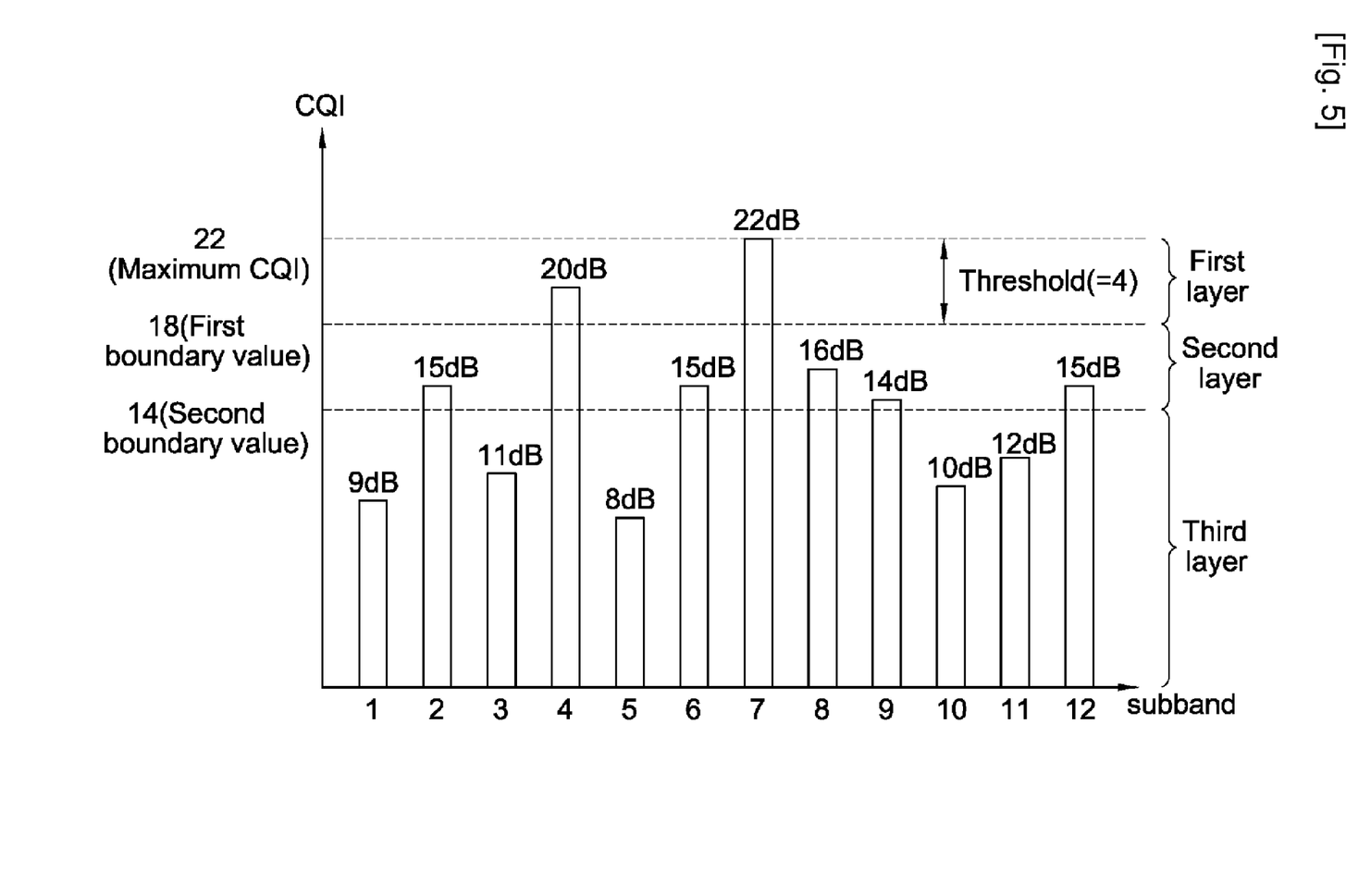
FIG. 5 is an exemplary view showing an example of CQI.
Figure 6:
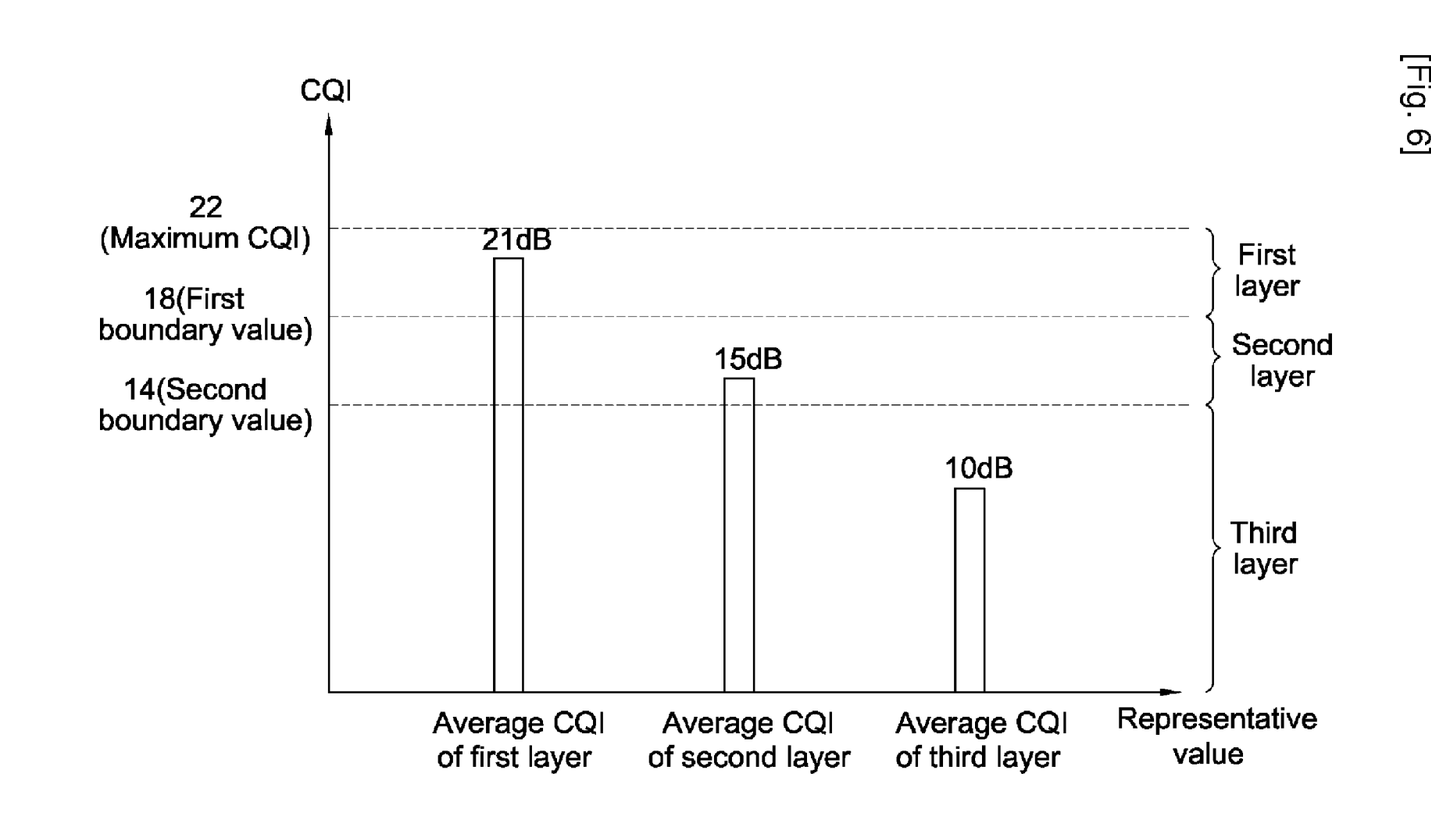
FIG. 6 is an exemplary view showing an embodiment of feedback data transmitted in the case of FIG. 5.

FIG. 5 is an exemplary view showing an example of CQI per on a sub-band basis. FIG. 6 is an exemplary view showing an embodiment of feedback data transmitted in the case of FIG. 5.

Referring to FIGS. 5 and 6, an overall band can be divided into a plurality of sub-bands. The sub-band includes a plurality of sub-carriers and the sub-band can also includes at least one resource block which includes a plurality of sub-carriers. The user equipment 110 measures one CQI every sub-band. That is, the overall band can be divided into N sub-bands and N CQIs can be generated.

N sub-bands can be classified into a plurality of layers according to CQI of each sub-band. The layers can be divided into (M+1) layers according to M boundary values. An average CQI of the sub-bands included in each layer can be found. A layered representative value, which represents each layer as will be described later on, can be generated based on a (M+1) layered average CQI. The layered representative value is included in the feedback data transmitted to the base station 100. Here, an index to designate a sub-band included in each layer can be transmitted together. The index can be represented as bitmap of N bits so that it can represent N sub-bands.

The boundary value to divide the layers can be determined on the basis of a maximum CQI of sub-band-based CQIs. A value in which a threshold is subtracted from the maximum CQI of the sub-band-based CQIs measured by the user equipment 110 can be decided as a boundary value (a first boundary value) between a first layer and a second layer. A value in which a threshold is subtracted from the first boundary value can become a boundary value (a second boundary value) between the second layer and a third layer. In this manner, up to a M-th boundary value can be found by deciding a value in which a specific threshold is subtracted from a boundary value with a neighboring upper layer as a boundary value with a lower layer. The range of a layer can be set to be identical by setting the same value to a threshold. Further, the range of each layer can be decided to be an unequal interval by gradually increasing or decreasing a threshold. A (M+1)-th layer, that is, the lowest layer is a layer for including sub-bands, which are not included in a M-th layer from the first layer and the range of the (M+1)-th layer can be decided differently from the range of other layers.

For example, if a maximum CQI of CQIs of sub-bands is 22 dB and a threshold is 4, a first boundary value between a first layer and a second layer is 22−4=18 dB. The range of the first layer becomes 4 dB from 18 dB to 22 dB. A second boundary value between the second layer and a third layer can become 18−4=14 dB by applying the same threshold of 4. The range of the second layer becomes 4 dB from 14 dB to 18 dB. The range of the third layer is smaller than the second boundary value. If a minimum CQI is −10 dB, the range of the third layer becomes 24 dB from −10 dB to 14 dB.

The threshold can be designated by the user equipment 110 and then sent to the base station 100. Alternatively, the base station 100 may designate the threshold and transmit it to the user equipment 110. The threshold may be previously set according to a communication system.

Further, the boundary value may be previously set. Alternatively, the user equipment 110 may designate the boundary value and transmit it to the base station 100, or the base station 100 may designate the boundary value and transmit it to the user equipment 110.

Here, it is assumed that when N=12 and each sub-band-based CQI is measured as shown in FIG. 5, M=2. The first layer is a layer including the highest CQI. In the first layer are included CQI (=20 dB) of a fourth sub-band and CQI (=22 dB) of a seventh sub-band. An average CQI of the first layer becomes (20+22)/2=21 dB. For clarity, an arithmetical mean is used to obtain an average CQI but various well-known methods can be used to obtain average CQI. In a second layer are included CQI (=15 dB) of a second sub-band, CQI (=15 dB) of a sixth sub-band, CQI (=16 dB) of an eighth sub-band, CQI (=14 dB) of a ninth sub-band, and CQI (=15 dB) of a twelfth sub-band. An average CQI of the second layer becomes (15+15+16+14+15)/5=15 dB. In a third layer are included CQIs of the remaining sub-bands. An average CQI of the third layer becomes (9+11+8+10+12)/5=10 dB.

Mean values 21 dB, 15 dB and 10 dB of respective layers can become representative values included in feedback data transmitted to the base station 100, as shown in FIG. 6. An index to designate sub-bands included in each layer can also be included in the feedback data transmitted to the base station 100. An index of the first layer is '000100100000' to designate the fourth sub-band and the seventh sub-band. An index of the second layer is '010001011001' to designate the second sub-band, the sixth sub-band, the eighth sub-band, the ninth sub-band and the twelfth sub-band. Since sub-bands included in the third layer can be known from the index of the first layer and the index of the second layer, an index of the third layer is not required. The average value of each layer can be represented by 5 bits. The bit number of feedback data transmitted by the user equipment 110 becomes 39 bits, which is the sum of the bit number (12 bits) of the index of the first layer, the bit number (5 bits) of an average CQI of the first layer, the bit number (12 bits) of the index of the second layer, the bit number (5 bits) of an average CQI of the second layer, and the bit number (5 bits) of an average CQI of the third layer.

The number of the sub-bands (N=12) and the number of the layers (M+1=3) are only illustrative, but not limited thereto. That is, in the case where N sub-bands are classified into (M+1) layers according to M boundary values, an average CQI of sub-bands included in each layer from the first layer to the (M+1)-th layer can be decided as a representative value of each layer. The bit number of feedback data transmitted by the user equipment 110 becomes N×M+5×(M+1)(when an average CQI is 5 bits).

Figure 7:
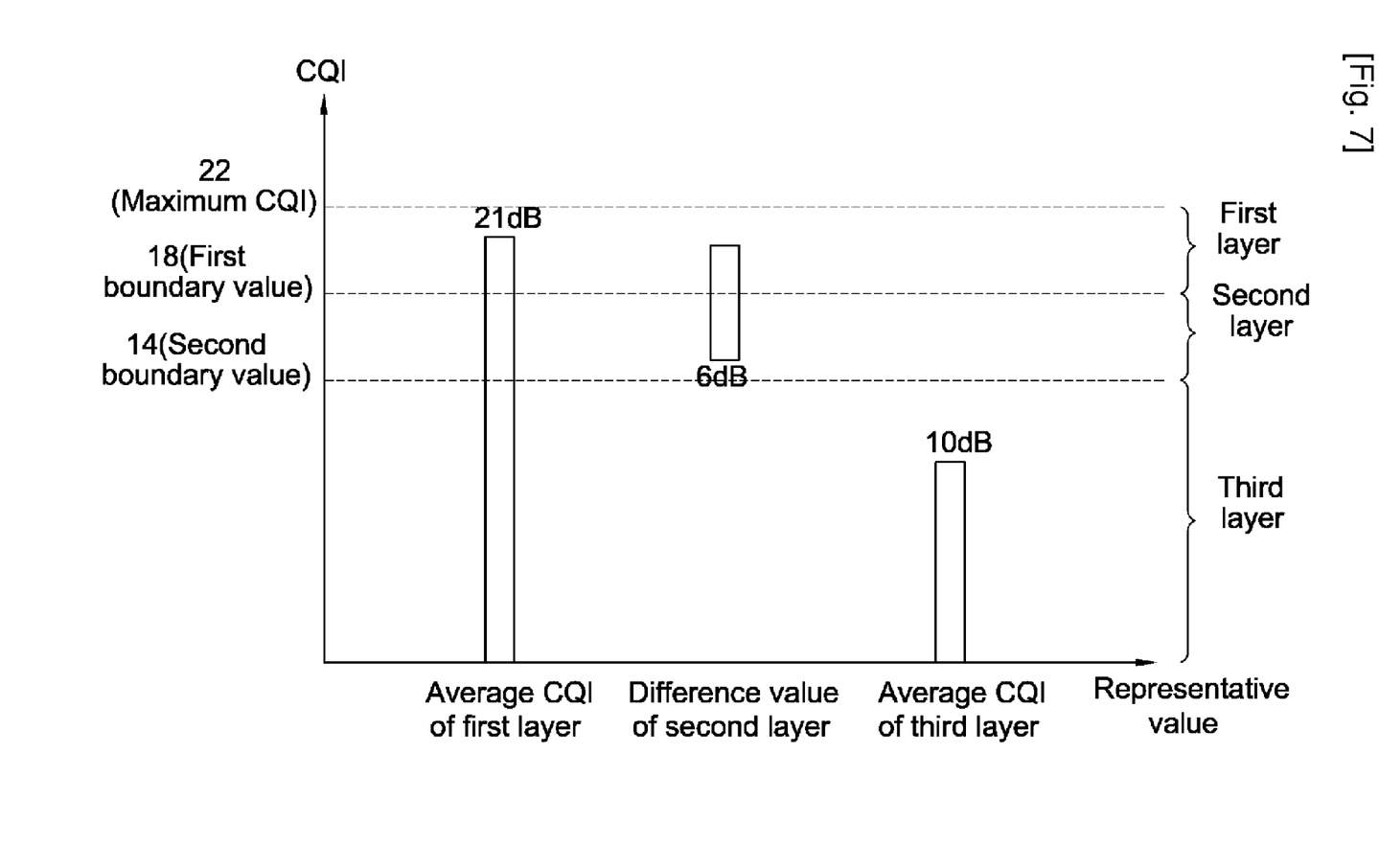
FIG. 7 is an exemplary view showing another embodiment of feedback data transmitted in the case of FIG. 5.

FIG. 7 is an exemplary view showing another embodiment of feedback data transmitted in the case of FIG. 5.

Referring to FIG. 7, when N=12 and M=2 as in FIG. 5, an average CQI of sub-bands included in a first layer can be decided as a representative value of the first layer, and a difference value between the representative value of the first layer and an average CQI of sub-bands included in a second layer can be decided as a representative value of the second layer. An average CQI of sub-bands included in a third layer can be decided as a representative value of the third layer.

The representative value of the first layer becomes 21 dB, which is the average CQI of the sub-bands included in the first layer. The representative value of the second layer becomes 6 dB, which is a difference value between the average CQI 21 dB of the first layer and the average CQI 15 dB of the second layer. The representative value of the third layer becomes 10 dB, which is the average CQI of the sub-bands included in the third layer. The user equipment 110 transmits the representative values 21 dB, 6 dB and 10 dB of the respective layer together with two indices. The representative value of the second layer becomes a value smaller than the average value and can be represented by 3 bits. The bit number of feedback data transmitted by the user equipment 110 becomes 37 bits, which is the sum of the bit number (12 bits) of an index of the first layer, the bit number (5 bits) of an average CQI of the first layer, the bit number (12 bits) of an index of the second layer, the bit number (3 bits) of a difference value of the second layer, and the bit number (5 bits) of an average CQI of the third layer.

The number of the sub-bands (N=12) and the number of the layers (M+1=3) are only illustrative, but not limited thereto. That is, in the case where sub-bands are classified into (M+1) layers according to M boundary values, the representative value of the first layer becomes an average CQI of the sub-bands included in the first layer. The representative value of each layer from the second layer to a M-th layer becomes a difference value between the representative value of the first layer and an average CQI of each layer. The representative value of a (M+1)-th layer becomes an average CQI of sub-bands included in the (M+1)-th layer. The bit number of feedback data transmitted by the user equipment 110 becomes N×M+5+3×(M−1)+5 (when the average CQI is 5 bits and the difference value is 3 bits).

Figure 8:
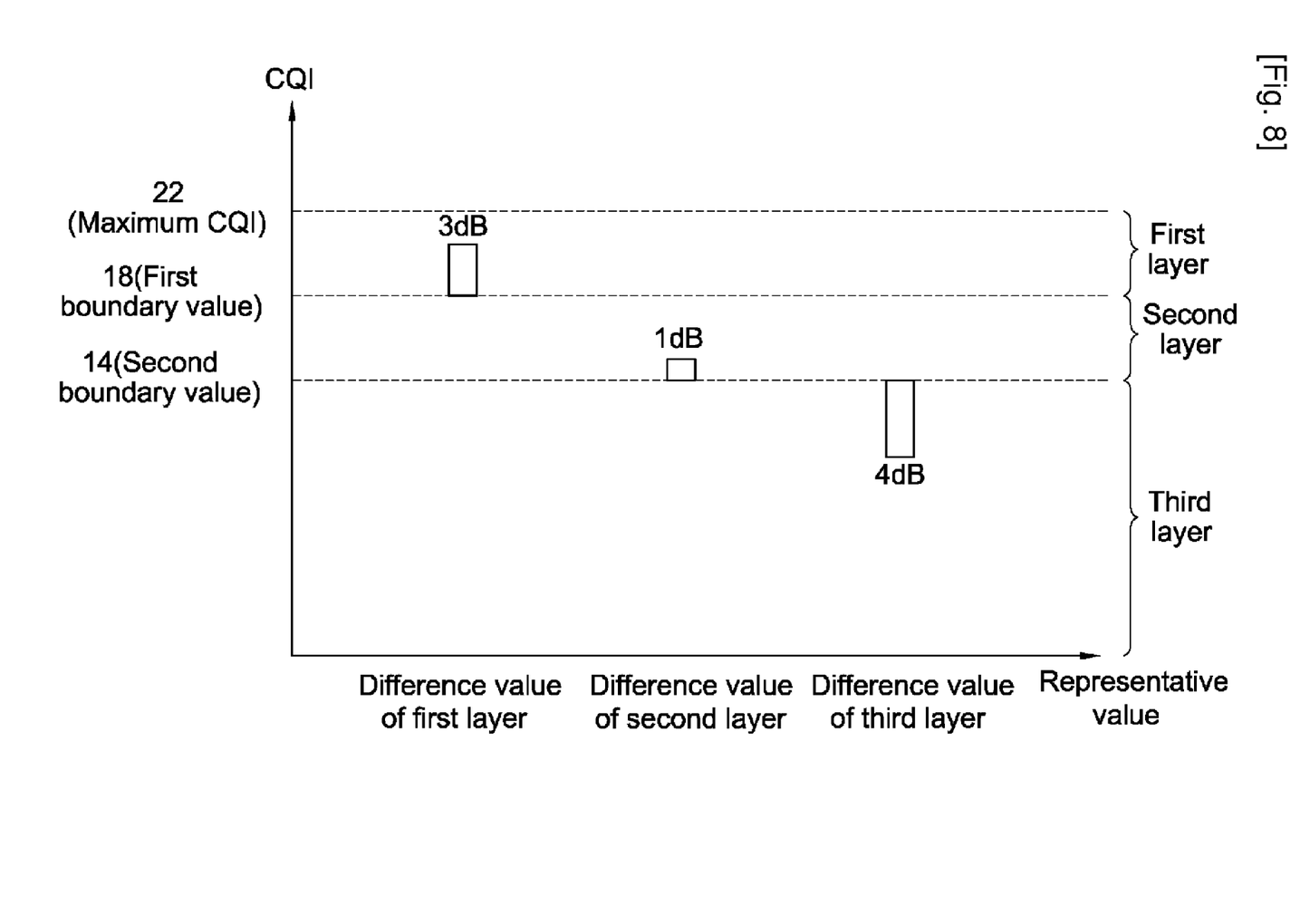
FIG. 8 is an exemplary view showing still another embodiment of feedback data transmitted in the case of FIG. 5.

FIG. 8 is an exemplary view showing still another embodiment of feedback data transmitted in the case of FIG. 5.

Referring to FIG. 8, when a boundary value and/or a threshold are previously set or known to the base station 100 and the user equipment 110 through mutual negotiation, the representative value of each layer can be represented as a difference value between an average CQI of sub-bands included in each layer and a boundary value with a neighboring layer.

When N=12 and M=2 as in FIG. 5, the representative value of a first layer can become a difference value between an average CQI of sub-bands included in the first layer and a first boundary value. The representative value of a second layer can become a difference value between an average CQI of sub-bands included in the second layer and a second boundary value. The representative value of a third layer can become a difference value between an average CQI of sub-bands included in the third layer and the second boundary value. That is, the representative value of the first layer becomes 21−18=3 dB. The representative value of the second layer becomes 15−14=1 dB. The representative value of the third layer becomes |10-14|=4 dB. The representative value of the third layer, that is, the lowest layer can be a difference value between an average CQI and a minimum CQI of the third layer. In other words, when the minimum CQI is −10 dB, the representative value of the third layer can become 10-(−10)=20 dB.

The user equipment 110 transmits the representative values 3 dB, 1 dB and 4 dB of the respective layers together with two indices. The representative value of each layer can be represented as 2 bits. The bit number of feedback data transmitted by the user equipment 110 becomes 30 bits, which is the sum of the bit number (12 bits) of an index of the first layer, the bit number (2 bits) of the difference value of the first layer, the bit number (12 bits) of an index of the second layer, the bit number (2 bits) of the difference value of the second layer, and the bit number (2 bits) of the difference value of the third layer.

Further, the representative value of the first layer can become a difference value between an average CQI and a maximum CQI of the sub-bands included in the first layer. The representative value of the second layer can become a difference value between an average CQI of the sub-bands included in the second layer and the first boundary value. The representative value of the third layer can become a difference value between an average CQI of the sub-bands included in the third layer and a second boundary value. That is, the representative value of the first layer becomes 22-21=1 dB. The representative value of the second layer becomes 18-15=3 dB. The representative value of the third layer becomes 14-10=4 dB. The user equipment 110 can transmit the representative values 1 dB, 3 dB and 4 dB of the respective layers together with two indices.

The number of the sub-bands (N=12) and the number of the layers (M+1=3) are only illustrative, but not limited thereto. The bit number of feedback data transmitted by the user equipment 110 becomes N×M+2×(M+1) (when the difference value is 2 bits).

As described above, in the case where sub-bands are classified into a plurality of layers according to each CQI and feedback data is generated and transmitted using the representative value and an index of each layer, reliable CQI can be transmitted using a less bit number. For example, if it is sought to transmit good CQIs of seven of twelve sub-bands together with indices, the bit number transmitted by the user equipment 110 becomes 52 bits, which is the sum of the bit number (12 bits) of the index, the bit number (5×7 bits) of seven CQIs and the bit number (5 bits) of an average CQI of the remaining sub-bands. As shown in FIG. 5, in the present invention, the number of CQIs of reliable sub-bands included in the first layer and the second layer becomes 7 and feedback data is 39 bits or less. Thus, reliable CQIs can be transmitted using a less bit number. Further, if good CQIs of four of twelve sub-bands are transmitted together with indices, the bit number of feedback data transmitted by the user equipment 110 becomes 37 bits, which is the sum of the bit number (12 bits) of n indices, the bit number (5×4 bits) of the four CQIs and the bit number (5 bits) of an average CQI of the remaining sub-bands. This is a similar bit number as that of feedback data of the present invention illustrated in FIG. 5, but the number of reliable CQIs is only four. That is, in the present invention, more CQIs of reliable sub-bands can be transmitted using a similar bit number.

The larger the number of CQIs of sub-bands included in the first layer or the second layer, the more reliable feedback data. It is meant that CQI can be transmitted more efficiently when sub-band-based CQI is relatively good. For example, in the case of slow fading with less change in sub-band-based CQI, CQI can be feedback more efficiently. When the user equipment 110 is in the slow fading state, the base station 100 can be adapted to generate a sub-band-based CQI as a layer-based representative value and transmit it, as in the present invention. Further, when the user equipment 110 is in a fast fading state with a great change in a sub-band-based CQI, the base station 100 can be adapted to transmit the CQI using another method.

The steps of a method described in connection with, the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting a channel quality indicator (CQI) in a wireless communication system, the method comprising:
obtaining CQIs for each of a plurality of sub-bands, a sub-band comprising a plurality of sub-carriers;
dividing the plurality of sub-bands into a plurality of layers according to a CQI of a sub-band, a layer comprising at least one sub-band;
obtaining a representative value of a representative layer, the representative layer including a sub-band having maximum CQI, wherein the representative value of the representative layer is an average value of CQIs of sub-bands belonging to the representative layer;
obtaining a representative value of a second layer, wherein an average value of CQIs of sub-bands belonging to the second layer is smaller than the representative value of the representative layer and representative value of the second layer is a difference value between the representative value of the representative layer and the average value of CQIs of sub-bands belonging to the second layer;
transmitting the representative value of the representative layer; and
transmitting the representative value of the second layer.

2. The method of claim 1, wherein the average CQI of the representative layer is largest among those of other layers.

3. A method of transmitting a channel quality indicator (CQI) in a wireless communication system, the method comprising:
obtaining CQIs for each of a plurality of sub-bands, a sub-band comprising a plurality of sub-carriers;
dividing the plurality of sub-bands into a plurality of layers according to a CQI of a sub-band, a layer comprising at least one sub-band;

obtaining a first representative value of a first layer and a second representative value of a second layer; and transmitting the first representative value and the second representative value, wherein the first representative value is an average value of the CQIs of the sub-bands belonging to the first layer, and the second representative value is a difference value between an average value of the CQIs of the sub-bands belonging to the second layer and the first representative value.

4. The method of claim 3, wherein the first layer includes a sub-band having maximum CQI.

5. The method of claim 3, further comprising:

obtaining a third representative value for remaining sub-bands which do not belong to the first layer and the second layer; and transmitting the third representative value.

6. The method of claim 5, wherein the third representative value is a difference value between an average value of the CQIs of the remaining sub-bands and the second representative value.

* * * * *